(12) United States Patent
Nishikitani et al.

(10) Patent No.: US 6,514,431 B1
(45) Date of Patent: Feb. 4, 2003

(54) ION CONDUCTIVE MATERIAL

(75) Inventors: Yoshinori Nishikitani, Yokohama (JP); Hiroshi Imafuku, Yokohama (JP); Shinji Ohshima, Yokohama (JP)

(73) Assignee: Nippon Mitsubishi Oil Corporation, Tokyo (JP)

( * ) Notice: Subject to any disclaimer, the term of this patent is extended or adjusted under 35 U.S.C. 154(b) by 0 days.

(21) Appl. No.: 09/688,293

(22) Filed: Oct. 13, 2000

(30) Foreign Application Priority Data

Oct. 14, 1999 (JP) ............................................. 11-291958

(51) Int. Cl.⁷ ............................. H01B 1/12; G02F 1/153
(52) U.S. Cl. ................... 252/500; 252/501.1; 252/62.2; 252/589; 428/690; 359/270; 359/273
(58) Field of Search ................................. 252/62.2, 500, 252/501.1, 583, 589; 359/265, 270, 273; 428/690

(56) References Cited

U.S. PATENT DOCUMENTS 5,780,180 A * 7/1998 Allemand et al. .......... 428/426
6,157,479 A * 12/2000 Heuer et al. ................ 359/265

FOREIGN PATENT DOCUMENTS

| EP | 0 736 794 A2 | 10/1996 |
| EP | 0 752 612 A1 | 1/1997 |
| EP | 0 855 615 A2 | 7/1998 |
| EP | 0 961 156 A2 | 12/1999 |

* cited by examiner

*Primary Examiner*—Mark Kopec
(74) *Attorney, Agent, or Firm*—Akin, Gump, Strauss, Hauer & Feld, L.L.P.

(57) ABSTRACT

An ion conductive material comprising a mixture of a solvent, a supporting electrolyte, and an ultraviolet absorber and alternatively a polymerizable monomer and having an ion conductivity at 25° C. of $1\times10^{-7}$ or greater; the ultraviolet absorber being contained in the ion conductive material in such an amount that the transmissivity of electromagnetic rays having a wavelength from 300 to 360 nm and transmitting through an layer of the ion conductive material of 0.2 mm in thickness can be maintained 0.1% or below. The ion conductive material is suitable for use in various electrochromic devices.

7 Claims, No Drawings

ION CONDUCTIVE MATERIAL

BACKGROUND OF THE INVENTION

1. Field of the Invention

This invention relates to ion conductive materials and more particularly to ion conductive materials having excellent ultraviolet absorptivity and enhanced electric conductivity. This invention also relates to an electrochromic device provided with a layer containing such ion conductive materials.

2. Description of the Prior Art

Recently, electrochemical devices using ion conductive materials such as polymeric solid electrolytes have been vigorously developed. Particularly in the electrochromic device field, a problem has been pointed out that the chromogenic layers are deteriorated with ultraviolet radiation. Such deterioration caused by ultraviolet radiation can be suppressed by arranging an ultraviolet absorbing layer in an electrochromic device. However, the arrangement of such an layer will increase the number of steps for producing the device and thus will be disadvantageous in terms of productivity.

In view of the current situations, the present invention is intended to provide an ion conductive material with excellent ion conductivity and an electrochromic device having an ion conductive layer containing the ion conductive material.

BRIEF SUMMARY OF THE INVENTION

After intensive research and efforts made to solve the above-described technical problems, it has been found that an ion conductive material having the structure described below can overcome these problems.

According to one embodiment of the present invention, there is provided an ion conductive material comprising a mixture of a solvent, a supporting electrolyte and an ultraviolet absorber and having an ion conductivity at 25° C. of $1 \times 10^{-7}$ or greater, the ultraviolet absorber being contained in the mixture in such an amount that the transmissivity of electromagnetic rays having a wavelength from 300 to 360 nm which transmit or penetrate through a 0.2 mm-thickness layer of the mixture can be maintained 0.1% or below.

According to the other embodiment of the present invention, there is provided an ion conductive material which is a solid ion conductive material obtained by solidifying a mixture of a solvent, a supporting electrolyte, a polymerizable monomer, and an ultraviolet absorber by polymerization of the monomer and has an ion conductivity at 25° C. of $1 \times 10^{-7}$ or greater; the ultraviolet absorber being contained in the mixture in such an amount that the transmissivity of electromagnetic rays having a wavelength from 300 to 360 nm which transmit or penetrate through a 0.2 mm-thickness layer of the mixture can be maintained 0.1% or below.

Furthermore, an electrochromic device according to the present invention is characterized in that an ion conductive layer formed by the above ion conductive- or solid ion conductive- material, and an electrochromic layer are disposed between two opposed electrically conductive substrates disposed in an opposing relation to each other and having on their inner surfaces an electrode layer.

DETAILED DESCRIPTION OF THE INVENTION

A first ion conductive material according to the present invention is comprised of a mixture containing a solvent, a supporting electrolyte, and an ultraviolet absorber as essential components, and has an ion conductivity at 25° C. of $1 \times 10^{-7}$ S/cm or greater, preferably $1 \times 10^{-6}$ S/cm or greater, more preferably $1 \times 10^{-5}$ S/cm or greater. An ion conductivity which deviates from this range would lead to insufficient responding performance of an electrochromic device.

The term "ion conductivity" used herein is a value calculated by analyzing Cole-Cole plot derived in accordance with a complex impedance method.

An ion conductive material with an ion conductivity within the aforesaid range may be made of a mixture containing a solvent, a supporting electrolyte, and an ultraviolet absorber. Solvents used herein may be conventional ones generally used in electrochemical cells or batteries, and any types of such solvents are applicable as long as they can dissolve a supporting electrolyte described later. Specific examples of the solvents are water, acetic anhydride, methanol, ethanol, tetrahydrofuran, propylenecarbonate, nitromethane, acetnitrile, dimethylformamide, dimethylsulfoxide, hexamethylphosamide, ethylenecarbonate, dimethoxyethane, γ-butyrolactone, γ-valerolactone, sulforan, dimethoxyethane, propionnitrile, glutaronitrile, adiponitrile, methoxyacetonitrile, dimethylacetoamide, methylpyrrolidinone, dimethylsulfoxide, dioxolane, sulforan, trimethylphosphate and polyethylene glycol. Among these solvents, the preferred are propylenecarbonate, ethylenecarbonate, dimethylsulfoxide, dimethoxyethane, acetnitrile, γ-butyrolactone, sulforan, dioxolane, dimethylformamide, dimethoxyethane, tetrahydrofuran, adiponitrile, methoxyacetonitrile, dimethylacetoamide, methylpyrrolidinone, dimethylsulfoxide, trimethylphosphate, and polyethylene glycol. These solvents may be used singly or in combination.

Supporting electrolytes used herein may be conventional ones used in electrochemical experiments or batteries, such as salts, acids, and alkalis. No particular limitation is imposed on salts used for the supporting electrolyte, which may be inorganic ion salts such as alkali metal salts and alkaline earth metal salts, quaternary ammonium salts, and cyclic quaternary ammonium salts. Specific examples of such salts are alkali metal salts of lithium, sodium or potassium such as $LiClO_4$, $LiSCN$, $LiBF_4$, $LiAsF_6$, $LiCF_3SO_3$, $LiPF_6$, $LiI$, $NaI$, $NaSCN$, $NaClO_4$, $NaBF_4$, $NaAsF_6$, $KSCN$ and $KCl$; quaternary ammonium salts or cyclic quaternary ammonium salts such as $(CH_3)_4NBF_4$, $(C_2H_5)_4NBF_4$, $(n-C_4H_9)_4NBF_4$, $(C_2H_5)_4NBr$, $(C_2H_5)_4NClO_4$ and $(n-C_4H_9)_4NClO_4$ and mixtures thereof. Among these, $LiClO_4$, $LiBF_4$, and $LiI$ are preferably used.

No particular limitation is imposed on acids. Any inorganic acids and organic acids may be used. Specific examples are sulfuric acid, hydrochloric acid, phosphoric acid, sulfonic acid, and carboxylic acid.

No particular limitation is imposed on alkalis as well. Sodium hydroxide, potassium hydroxide, and lithium hydroxide may be used.

No particular limitation is imposed on the content of such a supporting electrolyte in a mixture forming an inventive ion conductive material. The lower limit of the supporting electrolyte content is usually 0.01 M, preferably 0.1 M, and more preferably 0.2 M, based on the above-described solvent. The upper limit of the supporting electrolyte content is usually 20 M, preferably 10 M, and more preferably 5 M.

Eligible ultraviolet absorbers which are essential for the inventive ion conductive material may be conventionally known absorbers, such as benzotriazole-, benzophenone-, triazine-, salicylate-, cyanoacrylate-, and oxalic anilide-based compounds. Particularly preferred ultraviolet absorbers for the present invention are as follows:

Benzotriazole-based compounds represented by formula (1)

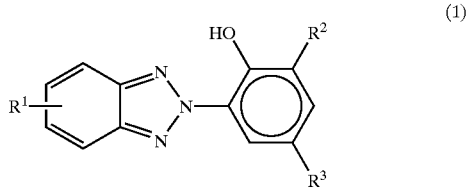

(1)

In formula (1), $R^1$ is hydrogen, a halogen atom or an alkyl group having 1 to 10, preferably 1 to 6 carbon atoms. Specific examples of the halogen atom are fluorine, chlorine, bromine and iodine. Specific examples of the alkyl group are methyl, ethyl, propyl, i-propyl, butyl, t-butyl and cyclohexyl groups. Preferred for $R^1$ are hydrogen and chlorine. $R^1$ is usually substituted at the 4- or 5-position of the benzotriazole ring but the halogen atom and the alkyl group are usually located at the 5-position.

$R^2$ is hydrogen or a hydrocarbon group having 1 to 10, preferably 1 to 8 carbon atoms. Examples of the hydrocarbon groups may be alkyl, cycloalkyl, aryl, and aralkyl groups More specific examples are methyl, ethyl, propyl, i-propyl, butyl, t-butyl, t-pentyl, cyclohexyl, and 1,1-dimethylbenzyl groups. The particularly preferred are t-butyl and 1,1-dimethylbenzyl groups.

$R^3$ is a hydrocarbon group having 4 to 10, preferably 4 to 8 carbon atoms, a carboxyl-substituted alkyl group having 2 to 10, preferably 2 to 4 carbon atoms and represented by —R—COOH wherein R is a divalent hydrocarbon group having 1 to 9 carbon atoms, or an alkyl group containing the carboxyl group, which is esterified, represented by —R—COOR' wherein R' is a hydrocarbon group having 1 to 12 carbon atoms. The alkyl chain portion (—R—) may be straight or branched and may be methylene, ethylene, trimethylene, propylene, ethylidene, and propylidene. Preferred hydrocarbon groups for $R^3$ are branched alkyl groups, and aralkyl groups such as t-butyl, t-pentyl, 1,1,3,3-tetramethylbutyl, and 1,1-dimethylbenzyl groups. Specific examples of groups represented by —R—COOR' are alkane acid alkyl esters such as propionic acid octyl ester.

Specific examples of such benzotriazole-based compounds are 3-(5-chloro-2H-benzotriazole-2-yl)-5-(1,1,1-dimethylethyl)-4-hydroxy-benzene propanoic acid, 3-(2H-benzotriazole-2-yl)-5-(1,1-dimethylethyl)-4-hydroxy-benzene ethanoic acid, 3-(2H-benzptriazole-2-yl)-4-hydroxybenzene ethanoic acid, 3-(5-methyl-2H-benzotriazole-2-yl)-5-(1-methylethyl)-4-hydroxybenzene propanoic acid, iso-octyl-3-(3-(2H-benzotriazole-2-yl)-5-t-butyl-4-hydroxyphenylpropionate, methyl-3-[3-t-butyl-5-(2H-benzotriazole-2-yl)-4-hydroxyphenyl]propionate, 2-(5'-methyl-2'-hydroxyphenyl)benzotriazole, 2-[2'-hydroxy-3',5'-bis(<,<-dimethylbenzyl)phenyl]-2H-benzotriazole, 2-(2'-hydroxy-5'-t-butylphenyl)benzotriazol, 2-(3',5'-di-t-butyl-2'-hydroxyphenyl)benzotriazole, 2-(2'-hydroxy-5'-t-octylphenyl)benzotriazole, 2-(3'-dodecyl-5'-methyl-2'-hydroxyphenyl)benzotriazole, 2-(2'-hydroxy-3', 5'-di-t-amyl-phenyl)-2H-benzotriazole, 2-(2'-hydroxy-3'-(3",4",5",6"-tetrahydrophthalimidemethyl)-5-methylphenyl)benzotriazole, 2-(3'-t-butyl-5'-methyl-2'-hydroxyphenyl)-5-chlorobenzotriazole, 2-(3',5'-di-t-butyl-2'-hydroxyphenyl)-5-chlorobenzotriazole, 2-[2-hydroxy-3,5-di(1,1-dimethylbenzyl)phenyl]-2H-benzotriazole, 2-[2-hydroxy-3-dimethylbenzyl-5-(1,1,3,3-tetramethylbutyl) phenyl]-2H-benzotriazole, 3-(5-chloro-2H-benzotriazole-2-yl)-5-t-butyl-4-hydroxyphenyl propanoic acid octyl ester, and 3-(5-chloro-2H-benzotriazole-2-yl)-5-t-butyl-4-hydroxyphenyl-n-propanol. Among these, the particularly preferred are 3-(5-chloro-2H-benzotriazole-2-yl)-5-t-butyl-4-hydroxyphenylpropanoic acid octyl ester and 3-(5-chloro-2H-benzotriazole-2-yl)-5-t-butyl-4-hydroxyphenyl-n-propanol.

Benzophenone-based compounds represented by formulae (2)–(5)

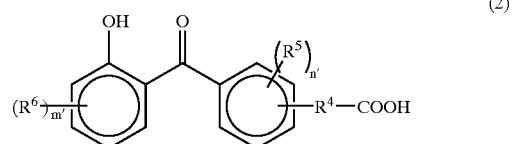

(2)

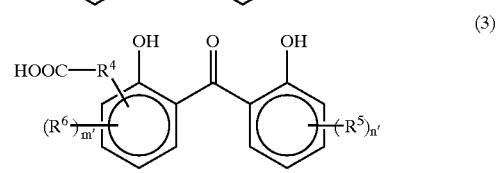

(3)

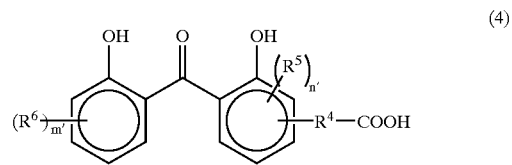

(4)

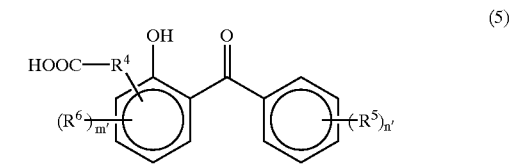

(5)

In formulae (2)–(5), $R^4$ indicates a covalent bond or is methylene, ethylene, or propylene group. $R^5$ and $R^6$ may be the same or different and are each independently a hydroxyl group or an alkyl or alkoxy group having 1 to 10, preferably 1 to 6 carbon atoms. The group of —$R^4$—COOH may not be present in these formulae. The letters "m'" and "n'" each denotes an integer of $0 \leq m' \leq 3$ and $0 \leq n' \leq 3$.

Specific examples of the alkyl group are methyl, ethyl, propyl, i-propyl, butyl, t-butyl, and cyclohexyl groups. Specific examples of the alkoxy group are methoxy, ethoxy, propoxy, i-propoxy, and butoxy groups.

Specific examples of the benzophenone-based compounds are 2-hydroxy-4-methoxybenzophenone-5-carboxylic acid, 2,2'-dihydroxy-4-methoxybenzophenone-5-carboxylic acid, 4-(2-hydroxybenzoyl)-3-hydroxybenzene propanoic acid, 2,4-dihydroxybenzophenone, 2-hydroxy-4-methoxybenzophenone, 2-hydroxy-4-methoxybenzophenone-5-sulfonic acid, 2-hydroxy-4-n-octoxybenzophenone, 2-hydroxy-4-dodecyloxybenzophenone 2,2'-dihydroxy-4-methoxybenzophenone, 2,2'-dihydroxy-4,4'-methoxybenzophenone, 2,2',4,4'-tetrahydroxybenzophenone, 2-hydroxy-4-methoxy-2'-carboxybenzophenone, and 2-hydroxy-4-methoxy-5-sulfonbenzophenone, among which the preferred is 2,2',4,4'-tetrahydroxybenzophenone.

Other than the above-exemplified benzotriazole- or benzophenone-based ultraviolet absorbers, another preferred ultraviolet absorbers are triazine-based compounds such as 2-(4,6-diphenyl-1,3,5-triazine-2-yl)-5-[(hexyl)oxy]- phenol, 2-[4-[(2-hydroxy-3-dodecyloxypropyl)oxy]-2-hydroxyphenyl]-4,6-bis(2,4-dimethylphenyl)-1,3,5-triazine, and 2-[4-[(2-hydroxy-3-tridecyloxypropyl)oxy]-2-hydroxyphenyl]-4,6-bis(2,4-dimethylphenyl)-1,3,5-triazine; salicylate-based compounds such as phenylsalicylate, p-t-butylphenylsalicylate, and p-octylphenylsalicylate; cyanoacrylate-based compounds such as 2-ethylhexyl-2-cyano-3,3'diphenylacrylate, and ethyl-2-cyano-3,3'-diphenylacrylate; and oxalic acid anilide-based compounds such as 2-ethoxy-2'-ethyle-oxalic acid bisanilide.

In the ion conductive material according to the present invention, the content of the ultraviolet absorber is very important. The ultraviolet absorber must be contained in the inventive ion conductive material in such an amount that when an electromagnetic radiation having a wavelength of 300 nm to 360 nm is irradiate to a layer composed of the ion conductive material with a thickness, i.e., optical path length, of 0.2 mm, the transmissivity of the electromagnetic radiation is maintained 0.1% or less. Furthermore, preferably even when the wavelength range of an electromagnetic radiation is widen to 300 nm to 380 nm, the transmissivity is maintained 0.1% or less. More preferably even when the wavelength range of an electromagnetic radiation is widen to 300 nm to 390 nm, the transmissivity is maintained 0.1% or less.

A light source of electromagnetic radiation used for measuring transmissivity may be a tungsten lump and/or a deuterium lump.

By restricting the ion conductive material content as described above, it is made possible to effectively suppress the decomposition of a solvent which is a component of the inventive ion conductive material, caused by ultraviolet radiation. Furthermore, such restricted ion conductive material content can suppress not only the occurrence of photochromism of the chromogenic layer of an electrochromic device if an ion conductive material is contained therein as an ion conductive layer, but also the decomposition of an redox chromogenic material caused by ultraviolet radiation.

Since ultraviolet absorbers vary in their ability, depending upon their type, the content of the ultraviolet absorber in the ion conductive layer formed with the inventive ion conductive material for an electrochromic device can not absolutely be determined with weight percent basis. However, the lower limit of such an ultraviolet absorber content is 0.1 weight percent, preferably 1 weight percent, while the upper limit is 20 weight percent, preferably 10 weight percent.

If necessary, a gelatinizer may be added to a first ion conductive material of the present invention. Such a gelatinizer may be acrylamide or agar.

The ion conductive material according to the present invention has substantially a transmittancy and a transmissivity of 10% to 100% in visible rays regions when the ion conductive material has a thickness, i.e., optical path length, of 0.2 mm.

A second ion conductive material of the present invention comprises a mixture of a solvent, a supporting electrolyte, an ultraviolet absorber, and a polymerizable monomer. The mixture can be formed into an ion conductive material by polymerizing the monomer so as to be cured. Since the ion conductive solid material has self-standing, the use of this material for the ion conductive layer of an electrochromic device makes it possible to enlarge the surface area thereof.

The above-described solvent, supporting electrolyte, and ultraviolet absorber can be used for the foregoing mixture forming the second ion conductive material. Furthermore, the ion conductivity of the ion conductive material and the content of an ultraviolet absorber contained therein are as defined with respect to the first ion conductive material. Therefore, only a polymerizable monomer will be described hereinafter.

The polymerizable monomer may be a polyurethane monomer. Alternatively, acryloyl or methacryloyl modified polyalkyleneoxides are also eligible. Preferred are acryloyl or methacryloyl modified polyalkyleneoxides.

Suitable polyurethane monomers are those having acryloyl or methacryloyl groups at both ends as represented by the formula

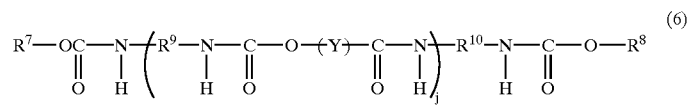

wherein $R^7$ and $R^8$ may be the same or different and are each a group of formula (7), (8) or (9) below, $R^9$ and $R^{10}$ may be the same or different and are each a divalent hydrocarbon residue having 1 to 20 carbon atoms, preferably 2 to 12 carbon atoms, Y is selected from a polyether unit, a polyester unit, a polycarbonate unit and the mixed unit thereof, and n is an integer from 1 to 100, preferably 1 to 50 and more preferably 1 to 20.

Formula (7), (8), and (9) are represented as follows:

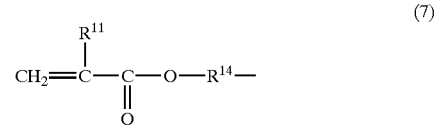

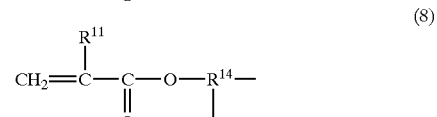

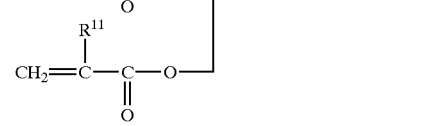

wherein $R^{11}$, $R^{12}$ and $R^{13}$ may be the same or different and are each hydrogen or an alkyl group having 1 to 3 carbon atoms, and $R^{14}$ is an organic residue having 1 to 20, preferably 2 to 8 carbon atoms, of divalent through quatervalent.

Specific examples of such organic residues are a hydrocarbon residue such as alkyltolyl, alkyltetratolyl, and alkylene groups of the formula

(10)

wherein $R^{15}$ is an alkyl group having 1 to 3 carbon atoms or hydrogen, k is an integer from 0 to 6, and if k is greater than 2 the groups of $R^{19}$ may be the same or different. The hydrocarbon residue such as an alkylene group represented by formula (10) may be a group part of which hydrogen atoms are substituted by an oxygen-containing hydrocarbon group such as an alkoxy group having 1 to 6, preferably 1 to 3 carbon atoms and an aryloxy group having 6 to 12 carbon atoms.

Specific examples of $R^{14}$ in formulae (7)–(9) are methylene, tetramethylene, 1-methyl-ethylene, 1,2,3-propanetriol, and neopentanetriyl.

Each of the divalent hydrocarbon residues represented by $R^9$ and $R^{10}$ in formula (6) is exemplified by aliphatic-, aromatic-, and alicyclic-containing hydrocarbon groups. Specific examples of the aliphatic hydrocarbon groups may be those represented by formula (13) above.

The divalent aromatic and alicyclic hydrocarbon groups may be those represented by formulae (11)–(13)

(11)

(12)

(13)

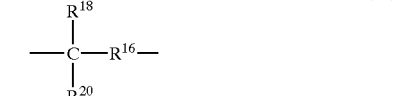

In formulae (11)–(13), $R^{16}$ and $R^{17}$ may be the same or different and are each independently a phenylene group, a phenylene group having an alkyl subsutituent, a cycloalkylene group and a cycloalkylene group having an alkyl substituent, $R^{18}$, $R^{19}$, $R^{20}$ and $R^{21}$ may be the same or different and are each independently hydrogen or an alkyl group having 1 to 3 carbon atoms and 1 is an integer from 1 to 5.

Specific examples of the groups $R^9$ and $R^{10}$ in formula (6) are those represented by the following formulae:

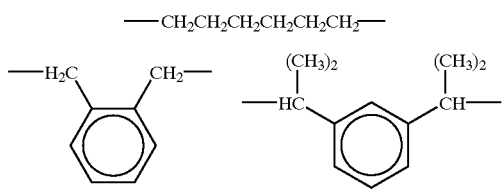

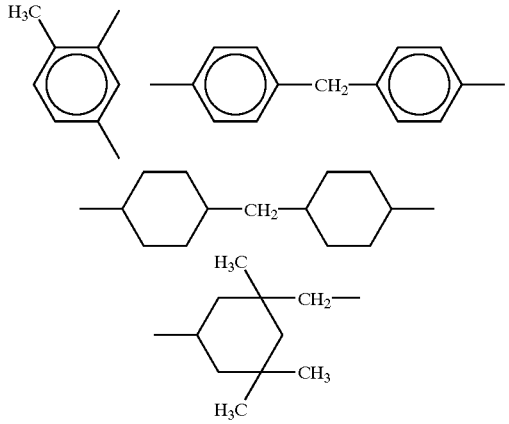

In formula (6), "Y" indicates a polyether unit, a polyester unit, a polycarbonate unit, and mixed units thereof. Each of these units is represented by the following formulae:

(c)

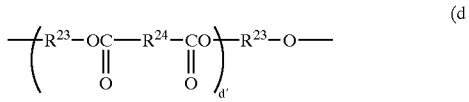

(d)

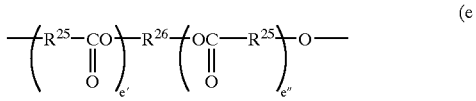

(e)

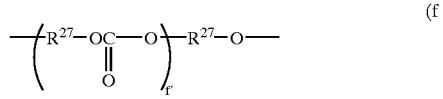

(f)

In formulae (c)–(f), $R^{22}$–$R^{27}$ may be the same or different and are each independently divalent hydrocarbon residue having 1 to 20, preferably 2 to 12 carbon atoms. $R^{22}$ through $R^{27}$ may be straight or branched alkylene groups. More specifically, preferred for $R^{24}$ are methylene, ethylene, trimethylene, tetramethylene, pentamethylene, hexamethylene and propylene groups. Preferred for $R^{22}$, $R^{23}$, $R^{26}$, and $R^{27}$ are ethylene and propylene groups. The letter "c'" denotes an integer from 2 to 300, preferably 10 to 200. The letter "d'" denotes an integer from 1 to 300, preferably 2 to 200. The letter "e'" denotes an integer from 1 to 200, more preferably 2 to 100. The letter "e'''" denotes an integer from 1 to 200, preferably 2 to 100. The letter "f" denotes an integer from 1 to 300, preferably 10 to 200.

In formulae (c)–(f), each unit may be a copolymer of the same or different units. Namely, in the case where a plurality of groups of $R^{22}$–$R^{27}$ are present in formulae (c)–(f), the groups of $R^{22}$ may be the same or different from each other, and the same applies to the groups of $R^{23}$, $R^{24}$, $R^{25}$, $R^{26}$, and $R^{27}$.

The molecular weight of the polyurethane monomer of formula (6) is usually 2,500 to 30,000, preferably 3,000 to 20,000, by weight average molecular weight. The number of the polymerization functional groups per molecule of the polyurethane monomer is within the range of preferably 2 to 6, more preferably 2 to 4. No particular limitation is imposed on the method of producing the polyurethane monomer of formula (10) and thus it can be produced by any suitable conventional method.

The other suitable polymerizable monomers for the present invention are acryloyl- or methacryloyl-modified polyalkylene oxides (hereinafter referred to as modified alkylene oxides). The polyalkylene oxides encompass mono-, di- or polyfunctional modified polyalkylene oxides. These may be used singly or in combination. It is particularly preferred to use a monofunctional modified polyalkylene oxide as an essential component in combination with a difunctional modified polyalkylene oxide and/or a polyfunctional polyalkylene oxide. It is particularly preferred to use a mixture of a monofunctional modified polyalkylene oxide and a difunctional modified polyalkylene oxide. Although not restricted, the difunctional modified polyalkylene oxide and/or the polyfunctional polyalkylene oxide should be added in a total amount of 0.1 to 20, preferably 0.5 to 10 parts by weight of 100 parts by weight, of the monofunctional modified polyalkylene oxide.

The monofunctional modified polyalkylene oxide is represented by the formula

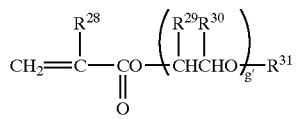

(14)

wherein $R^{28}$, $R^{29}$, $R^{30}$, and $R^{31}$ are each independently hydrogen or an alkyl group having 1 to 5 carbon atoms, and g' is an integer of 1 or more.

In formula (14), $R^{28}$, $R^{29}$, $R^{30}$, and $R^{31}$ are each independently hydrogen or an alkyl group having 1 to 5 carbon atoms. Preferred alkyl groups are methyl, ethyl, i-propyl, n-propyl, n-butyl, t-butyl and n-pentyl groups. It is preferred that $R^{28}$ is hydrogen or methyl, $R^{29}$ is hydrogen or methyl, $R^{30}$ is hydrogen or methyl and $R^{31}$ is hydrogen, methyl or ethyl.

The letter "g'" denotes an integer of 1 or greater, generally from 1 to 100, preferably 2 to 50, and more preferably 2 to 30.

Specific examples of the compound of formula (14) are those having 1 to 100, preferably 2 to 50, more preferably 2 to 20 of oxyalkylen units, such as methoxypolyethylene glcyol methacrylate, methoxypolypropylene glycol methacrylate, ethoxypolyethylene glycol methacrylate, ethoxypolypropylene glycol methacrylate, methoxypolyethylene glycol acrylate, methoxypolypropylene glycol acrylate, ethoxypolyethylene glycol acrylate, ethoxypolypropylene glycol acrylate and mixtures thereof. Among these, methoxypolyethylene glycol methacrylate and methoxypolyethylene glycol acrylate are preferably used.

If g' is 2 or greater, the monofunctional modified polyalkylene oxide may be those having different oxyalkylene units, i.e., copolymerized oxyalkylene units which may be alternating-, block- or random-polymerized and have 1 to 50, preferably 1 to 20 oxyethylene units and 1 to 50, preferably 1 to 20 oxypropylene unit. Specific examples of such copolymers are methoxypoly(ethylene-propylene) glycol methacrylate, ethoxypoly(ethylene-propylene)glycol methacrylate, methoxypoly(ethylene-propylene)glycol acrylate, ethoxypoly(ethylene-propylene)glycol acrylate and mixtures thereof.

The difunctional modified polyalkylene oxide is represented by the formula

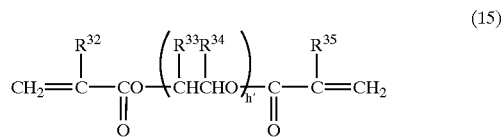

(15)

wherein $R^{32}$, $R^{33}$, $R^{34}$, and $R^{35}$ are each independently hydrogen or an alkyl group having 1 to 5 carbon atoms, h' is an integer of 1 or greater.

The polyfunctional modified polyalkylene oxide having 3 or more functional groups is represented by the formula

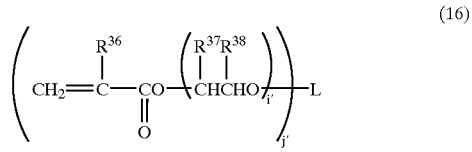

(16)

wherein $R^{36}$, $R^{37}$, and $R^{38}$ are each independently hydrogen or an alkyl group having 1 to 5 carbon atoms, i' is an integer of 1 or greater, j' is an integer from 2 to 4, and L is a connecting groups of valence indicated by "j'".

In formula (13), $R^{32}$, $R^{33}$, $R^{34}$ and $R^{35}$ may be the same or different and are each independently hydrogen or an alkyl group having 1 to 5 carbon atoms. Specific examples of the alkyl group are methyl, ethyl, i-propyl, n-propyl, n-butyl, t-butyl and n-pentyl groups. It is preferred that $R^{32}$ is hydrogen or methyl group, $R^{33}$ is hydrogen or methyl, $R^{34}$ is hydrogen or methyl and $R^{35}$ is hydrogen, methyl or ethyl.

In formula (15), the letter "h'" denotes an integer of 1 or greater and within the range of usually $1 \leq h' \leq 100$, preferably $2 \leq h' \leq 50$, more preferably $2 \leq h' \leq 30$. Specific examples of the compound of formula (13) are those having 1 to 100, preferably 2 to 50, more preferably 2 to 20 of oxyalkylene units, such as polyethylene glycol dimethacrylate, polypropylene glycol dimethacrylate, polyethylene glycol methacrylate, polypropylene glycol dimethacrylate, and mixtures thereof.

If h' is 2 or greater, the difunctional modified polyalkylene oxide may be those having different oxyalkylene units, i.e., copolymerized oxyalkylene units which may be alternating-, block- or random-polymerized and have 1 to 50, preferably 1 to 20 oxyethylene units and 1 to 50, preferably 1 to 20 oxypropylene units. Specific examples of such copolymers are poly(ethylene-propylene)glycol dimethacrylate, poly(ethylene-propylene)glycol diacrylate, and mixtures thereof.

$R^{36}$, $R^{37}$ and $R^{38}$ in formula (16) are each independently hydrogen or an alkyl group having 1 to 5 carbon atoms. Specific examples of the alkyl group are methyl, ethyl, i-propyl, n-propyl, n-butyl, t-butyl and n-pentyl groups. $R^{36}$, $R^{37}$ and $R^{38}$ are each preferably hydrogen or methyl.

The letter "i'" denotes an integer of 1 or greater and generally is within the range of $1 \leq i' \leq 100$, preferably $2 \leq i' \leq 50$, more preferably $2 \leq i' \leq 30$.

The letter "j'" denotes the number of connecting group "L" and is an integer of $2 \leq j' \leq 4$.

Connecting group "L" is a divalent, trivalent or quatravalent hydrocarbon group having 1 to 30, preferably 1 to 20 carbon atoms. The divalent hydrocarbon group may be alkylene, arylene, arylalkylene and alkylarylene groups and hydrocarbon groups having those groups as the main chain. Specific examples of the divalent hydrocarbon group are a methylene group, an ethylene group and a group represented by

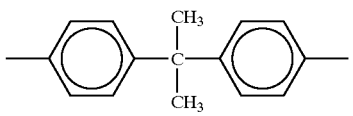

The trivalent hydrocarbon group may be alkyltryl, aryltryl, arylalkyltryl, alkylaryltryl and hydrocarbon groups having those groups as the main chain. Specific examples of the trivalent hydrocarbon group are those represented by the following formulae:

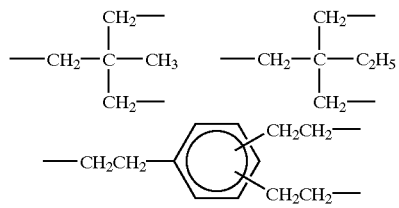

The quatravalent hydrocarbon group may be alkyltetrayl, aryltetrayl, arylalkyltetrayl and alkylaryltetrayl groups and hydrocarbon groups having these groups as a base skeleton. Specific examples of the quatravalent hydrocarbon groups are those represented by the following formulae:

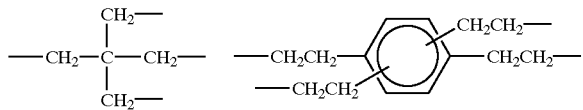

Specific examples of the compound of formula (16) are those having 1 to 100, preferably 2 to 50, more preferably 1 to 20 oxyalkylene units, such as trimethylolpropanetri (polyethylene glycol acrylate), trimethylolpropanetri (polyethylene glycol methaacrylate), trimethylolpropanetri (polypropylene glycol acrylate), trimethylolpropanetri (polypropylene glycol methaacrylate), tetramethylolmethanetetra(polyethylene glycol acrylate), tetramethylolmethanetetra(polyethylene glycol methaacrylate), tetramethylolmethanetetra(polypropylene glycol acrylate), tetramethylolmethanetetra(polypropylene glycol methaacrylate), 2,2-bis[4-(acryloxypolyethoxy)phenyl]propane, 2,2-bis[4-(methaacryloxypolyethoxy)phenyl]propane, 2,2-bis[4-(acryloxypolyisopropoxy)phenyl]propane, 2,2-bis[4-(methaacryloxypolyisopropoxy)phenyl]propane and mixtures thereof.

If i' in formula (14) is 2 or greater, the compound may be those having different oxyalkylene units from each other, i.e., copolymerized oxyalkylene units which result from alternating-, block- or random-copolymerization. Specific examples of such compounds are copolymers, block copolymers or random copolymers having 1 to 50, preferably 1 to 20 of oxyethylene units and 1 to 50, preferably 1 to 20 of oxypropylene units, such as trimethylolpropanetri(poly(ethylene-propylene)glycol acrylate), trimethylolpropanetri(poly(ethylene-propylene)glycol methaacrylate), tetramethylolmethanetetra(poly(ethylene-propylene)glycol acrylate), tetramethylolmethanetetra(poly(ethylene-propylene)glycol acrylate) and mixtures thereof.

There may be used the difunctional modified polyalkyleneoxide of formula (15) and the polyfunctional modified polyalkyleneoxide of formula (16) in combination. When these compounds are used in combination, the weight ratio of these compounds is within the range of 0.01/99.9–99.9/0.01, preferably 1/99–99/1, more preferably 20/80–80/20.

The above-described polymerizable monomer is used in such an amount that is suitable for the formation of the inventive ion conductive solid material. Generally, the lower limit of the polymerizable monomer content is 5 weight percent, preferably 10 weight percent, while the upper limit of the same is 80 weight percent, preferably 50 weight percent, and more preferably 30 weight percent, based on the total weight of a mixture of the above-described solvent, supporting electrolyte, ultraviolet absorber and polymerizable monomer.

A photo polymerization initiator and a thermal polymerization initiator may be added to the mixture forming an ion conductive solid material of the present invention. If necessary, a polymerization promoter may also be added to the mixture.

The photo polymerization initiator may be benzoin-, acetophenone-, benzylketal- or acylphosphineoxide-based ones. Specific examples of such photo polymerization initiators are acetophenone, benzophenone, 4-methoxybenzophenone, benzoin methyl ether, 2,2-dimethoxy-2-phenyldimethoxy-2-phenylacetophenone, 2,2-dimethoxy-1,2-diphenylethane-1-on, benzyl, benzoyl, 2-methylbenzoyl, 2-hydroxy-2-methyl-1-phenyl-1-on, 1-(4-isopropylphenyl)-2-hydroxy-2-methylpropane-1-on, triphenylphosphine, 2-chlorothioxantone, 2-hydroxy-2-methyl-1-phenylpropane-1-on, 1-hydroxycyclohexylphenylketone, 2,2-dimethoxy-2-phenylacetophenone, 2-methyl-1[4-(methylthio)phenyl]-2-morpholinopropanone-1-on, 2-benzyl-2-dimethylamino-1-(4-morpholinophenyl)-butane-1-on, 1-[4-(2-hydroxyethoxy)phenyl]-2-hydroxy-2-methyl-1-propane-1-on, diethoxyacetophenone, 1-(4-isopropylphenyl)-2-hydroxy-2-methylpropane-1-on, benzoin, 2,4,6-trimethylbenzoyldiphenylphosphineoxide, bis(2,4,6-trimethylbenzoyl)-phenylphosphineoxide, bis(2,6-dimethoxybenzoyl)-2,4,4-trimetyl-pentylphosphineoxide, bis($\eta^5$-2,4-cyclopentadiene-1-yl)-bis(2,6-difluoro-3-(1H-pyrrole-1-yl)phenyl)titanium,$\eta^5$-cyclopentadienyl-$\eta^6$-cumenyl-iron(1+)-hexafluorophosphate(1−). These may be used singly or in combination.

Eligible thermal polymerization initiators may be selected from known initiators such as peroxide initiators or azo initiators. Specific examples of such peroxide initiators are benzoyl peroxide, methylethyl peroxide, t-butylperoxypivalate and diisopropylperoxycarbonate. Specific examples of such azo initiators are 2,2'-azobis(2-isobutylonitrile), 2,2'-azobisisobutylonitrile, 2,2'-azobis(2,4-dimethylvaleronitrile) and 1,1'-azobis(cyclohexane-1-carbonitrile). These may be used singly or in combination.

The polymerization initiator is used in an amount of 0.1 part by weight or more, preferably 0.5 part by weight or more. The upper limit is 10 part by weight, preferably 5 part by weight.

A mixture containing the polymerizable monomer can be cured with light or heat. For instance, the mixture is placed between a pair of appropriate substances and then applied with light or heat, thereby being able to obtain an ion conductive layer for an electrochromic device. The term "cure" used herein designates a state where the polymerizable monomer in the mixture is cured with the progress of polymerization or crosslinking and thus the entire mixture does not flow at room temperature. The composition thus cured often has the basic structure in the form of network (three-dimensional network structure).

Photo-curing may be done by applying far ultraviolet radiation, ultraviolet radiation and visible rays to the mixture preferably containing a photo polymerization initiator. Used as light sources are high voltage mercury lamps, fluorescent lamps and xenon lamps. The lower limit of irradiation dose is usually 100 mJ/cm$^2$, preferably 1,000 mJ/cm$^2$. The upper limit of irradiation dose is 50,000 mJ/cm$^2$, preferably 20,000 mJ/cm$^2$.

In the case where the mixture contains a thermal polymerization initiator, thermal curing is employed. Thermal curing is conducted at a temperature of 0 to 130° C., preferably 20 to 80° C. and for 30 minutes to 100 hours, preferably 1 hour to 40 hours.

Any suitable crosslinkers may be added to the mixture containing the polymerizable monomer for the purpose of enhancing the mechanical strength of the resulting cured product. If necessary, the mixture to be photo- or thermal cured may be blended with one or more of polymers such as polyacrylonitrile, carboxymethyl cellulose, polyvinyl chloride, polyethyleneoxide, polyurethane, polyacrylate, polymethacrylate, polyamide, polyacrylamide, cellulose, polyester, and polypropyleneoxide. Furthermore, the mixture may be blended with a polymeric solid electrolyte such as nafion, polystylene sulfonate, $Li_3N$, $Na-\beta-Al_2O_3$, $Sn(HPO_4)_2\beta H_2O$.

Redox agents and photostabilizing agent are optional components which may be added commonly to the first ion conductive material and the second ion conductive solid material of the present invention. In the case where the ion conductive layer is formed from any of the foregoing ion conductive materials, the addition of a redox agent facilitates coloration or decoloration of the electrochromic layer. Examples of such a redox agent are metallocenes such as ferrocene and derivatives thereof; 5,10-dihydrophenazine derivatives such as phenoxazine, 5,10-dihydro-5,10-dimethylphenazine, and 5,10-dihydro-5,10-diphenylphenazine; 1,4-phenylenediamine derivatives such as N,N,N',N'-tetramethyl-1,4-phenylenediamine, and N,N,N',N'-tetraphenyl-1,4-phenylenediamine; benzidine derivatives such as N,N,N',N'-tetramethylbenzidine; tetrathiafulbarren; and o-toluidine. Although not restricted, the redox agent is added in a concentration of 1 mM or greater, preferably 5 mM or greater, and more preferably 10 mM or greater and 100 mM or less, preferably 50 mM or less, and more preferably 30 mM or less.

Specific examples of suitable photo stabilizing agents are dimethyl-1-(2-hydroxyethyl)-4-hydroxy-2,2,6,6-tetramethylpiperidine succinate polycondensate, N,N'''-1,2-ethanediylbis[N-[3-[[4,6-bis[butyl(1,2,2,6,6-pentamethyl-4-piperidinyl)amino]-1,3,5-triazine-2-yl]amino]propyl]-N,N'-dibutyl-N',N'-bis(1,2,2,6,6-pentamethyl-4-piperidinyl)-1,3,5-triazine-2,4,6-triamine], bis(1,2,2,6,6-pentamethyl-4-piperidinyl)-[[3,5-bis1,1-dimethylethyl]-4-hydroxyphenyl]methyl]butylmalonate, bis(1-octyloxy-2,2,6,6-tetramethyl-4-piperidyl)sebacate, bis(1,2,2,6,6-pentamethyl-4-piperidinyl)-sebacate, 1-(methyl)-8-(1,2,2,6,6-pentamethyl-4-piperidinyl)-sebacate, dimethyl1-1(2-hydroxyethyl)-4-hydroxy-2,2,6,6-tetramethylpiperidine succinate polycondensate, poly[{6-(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}], N,N'-bis(3-aminopropyl)ethylenediamine-2,4-bis[N-butyl-N-(1,2,2,6,6-pentamethyl-4-piperidyl)amino]-6-chloro-1,3,5-triazine condensate, bis(2,2,6,6-tetramethyl-4-piperidyl)sebacate, bis(1,2,2,6,6-pentamethyl-4-piperidinyl)sebacate, and 2,4-di-t-butylphenyl-3,5-di-t-butyl-4-hydroxybenzoate.

Other than these additives, electrically insulated particles may be added to the ion conductive materials of the present invention. Such particles act as spacers for providing a space between a pair of substrates into which space an ion conductive material is inserted.

The following will describe an electrochromic device in which the inventive ion conductive material is used as an ion conductive layer. An electrochromic device is essentially comprised of a pair of electrically conductive substrates between which an ion conductive layer and an electrochromic layer are disposed. The term "electrically conductive substrates" used herein designates those at least one of which acts as an electrode. Therefore, the conductive substrate encompasses a metallic substrate which itself has an electric conductivity or a composite substrate comprising a transparent or opaque non-electrically conductive substrate and a transparent or opaque electrically conductive layer disposed on one of the surfaces thereof. These electrically conductive substrates necessarily have a smooth surface at normal temperature but may have a flat or curved surface and may be deformable under stress.

Eligible materials for the metallic conductive substrate are iron, copper, aluminum, tin, lead, gold, and zinc all of which may be used singly, and alloys thereof. Eligible materials for the transparent or opaque non-electrically conductive substrates are a variety of plastics, resins, glasses, woods and stones. The transparent substrate may be a color or colorless glass, a wire glass, a heat rays absorbing glass, a heat rays reflective glass, a reinforced glass, a glass block. Resins having color or colorless transparency are also eligible. Specific examples of such resins are polyesters such as polyethylene terephthalate, polyamide, polysulfone, polyether sulfone, polyether etherketone, polyphenylene sulfide, polycarbonate, polyimide, polymethyl methacrylate, polystyrene, tricellulose acetate, and polyethypentene. The term "transparent" used herein denotes a transmissivity of usually 3% or greater, preferably within the range of 10 to 100%.

At least one of the pair of electrically conductive substrates is preferably a transparent electrically conductive substrate. Such a transparent electrically conductive substrate may be produced by providing a transparent electrically conductive film, i.e., an electrode layer on a transparent non-electrically conductive substrate. Materials for the electrode layer may be gold, silver, chrome, copper and tungsten or metal oxides such as ITO ($In_2O_3$—$SnO_2$), $SnO_2$:F, tin oxide, silver oxide, ZnO:Al, zinc oxide and vanadium oxide.

The electrode layer has a film thickness in the range of usually 100 to 5,000 and preferably 500 to 3,000 angstrom. The surface resistance of the electrode is usually in the range of 0.5–500 $\Omega/cm^2$ and preferably 1–50 $\Omega$/sq. Any suitable known method for forming the electrode layer on the transparent substrate can be employed, depending on the type of material for the layer. In general, the electrode layer is formed by vacuum evaporation, ion plating, sputtering and a sol-gel method. In any of the methods, the electrode layer is preferably formed when the substrate is heated at a temperature of 100 to 350° C.

For the purpose of providing oxidation-reduction capability, electric conductivity, and electric double layer capacitance, the electrode layer may be partially provided with an opaque electrode-activator. The electrode-activator is preferably provided in such an amount that the transparency of the entire electrode layer is not harmed. Electrode activators eligible for the purpose of the invention are a metal such as copper, silver, gold, platinum, iron, tungsten, titanium and lithium, an organic material having an oxidation-reduction capability such as polyaniline, polythiophen, polypyrrole and phthalocyanine, a carbon material such as active carbon and graphite and a metal oxide such as $V_2O_5$, $WO_3$, $MnO_2$, $NiO$ and $Ir_2O_3$ and mixtures thereof. A variety of resins may be used for integrating the electrode activator to the electrode.

The opaque electrode activator may be applied onto an electrode by forming on an ITO transparent electrode a composition comprising an active carbon fiber, graphite and an acrylic resin into a micro pattern in the shape of stripes or by forming on a thin-film of gold a composition comprising $V_2O_5$, acetylene black and butyl rubber in the shape of a mesh.

Particularly preferred electrically conductive substrates are composite substrates forming an electrode using a composition containing a specific electrically conductive particulate and a specific binder, onto the electrically conductive substrate.

The electrically conductive particulate used herein preferably has a capacitance of 1 farad/g or greater, preferably 10 farad/g or more. Furthermore, the electrically conductive particulate exhibits an electrical conductivity of $10^{-8} S \cdot cm^{-1}$ or greater, preferably $10^{-5} S \cdot cm^{-1}$ or greater, and more preferably $10^{-2} S \cdot cm^{-1}$ or greater or has a capacitance of usually 1 coulomb/g or greater, preferably 5 coulomb/g or greater, and more preferably 10 coulomb/g or greater.

No particular limitation is imposed on the particle size of the electrically conductive particulate as long as the purpose of the present invention can be achieved. However, the particle size is usually within the range of 500 $\mu$m to 0.1 $\mu$m, preferably 200 $\mu$m to 0.3 $\mu$m, and more preferably 50 $\mu$m to 0.5 $\mu$m on an average. No particular limitation is imposed on the particle size distribution of the electrically conductive particulate as long as the purpose of the present invention can be achieved. However, the upper limit of the particle size is preferably 700 $\mu$m.

One examples of such a electrically conductive particulate is a porous carbon, i.e. activated carbon having a surface area of 10 $m^2/g$ or greater, preferably within the range of 50 to 5,000 $m^2/g$, and particularly preferably within the range of 300 to 4,000 $m^2/g$. By using the surface are of porous carbon which is less than 10 $m^2/g$, color developing efficiency would become insufficient, and varies depending upon an electric voltage to be applied. Eligible porous carbon can be obtained by activating coconut shell, petroleum pitch, Kynol fiber, phenol fiber rayon, phenol fiber, and polyacrylonitrile fiber to be carbonized.

The pH of the porous carbon constituting an electrode layer is closely associated with the electrochromic characteristics of the resulting electrochromic device. Especially, in the case of using a reducing chromogenic material such as $WO_3$, the pH of the porous carbon is preferably 7 or greater. The term "pH" used herein denotes the pH of a filtrate obtained by dispersing 4 g of powdery porous carbon in 100 g of pure water with stirring and then separating the powdery porous carbon. Particularly preferred porous carbon is activated carbon obtained by activating coconut shell.

The other examples of the electrically conductive particulate are intercalation materials and electrically conductive polymers. Particularly preferred are intercalation materials and electrically conductive polymers which can store the above-described capacitance at a voltage of within 3V.

Specific examples of the intercalation materials are disulfides such as $TiS_2$ and $MoS_2$, dioxides such as $CoO_2$ and $NiO_2$, electrochromic oxides such as $W_{18}O_{49}$ and $W_{20}O_{58}$. Specific examples of the electrically conductive polymers are those obtained by doping a composition containing polyalinine, polythiophene, polypyrrole, polyphenylenevinylene, and polyallene, as main components.

Binders used in combination with the above-described particulate may be silicone resins, epoxysilane resins, phenol resins, and epoxy resins, among which silicone resins are preferred. The molecular weight of a resin to be used as the binder is within the range of 200 to 20,000, preferably 500 to 15,000, more preferably 1,000 to 10,000, and most preferably 2,000 to 6,000.

In the case of using a silicone resin as the binder, it is preferably a reactive silicone resin, i.e., one having an alkoxysilyl group or a silanole group. In general, such a reactive resin can be synthesized by partial hydrolysis reaction of alkoxysilanes or chlorosilanes, and subjecting the reaction product to a condensation reaction. Commercially available silicone resins are a pure silicone varnish such as "XO7931-Clear" manufactured by Okitsumo Co., Ltd., a silicone resin such as "SR$^{2410}$" manufactured by Toray. Dow Coming Silicone Co., Ltd. and "RZ7703" manufactured by Nihon Unicar Co., Ltd., and acryl-modified silicone resin such as "Sairacoat 1000" manufactured by Chisso Co., Ltd. These silicone resins can be put in use after being dissolved in various types of solvents to an extent that the achievement of the purpose of the present invention is not hindered. Eligible solvents are various hydrocarbon-containing solvents, ketones, ethers, esters, and ether|esters. Various modified silicone resins may also be used.

Conditions under which a composition containing the above-described electrically conductive particulate and binder are properly selected depending upon the types of electrically conductive particulate and binder to be used. For instance, such a composition may be cured by heating at a temperature within the range of 20° C. to 350° C., preferably 70° C. to 300° C., more preferably 100° C. to 250° C., and most preferably 120° C. to 180° C. for a period of 10 minutes to 300 minutes, preferably 30 minutes to 200 minutes, more preferably 40 minutes to 150 minutes, and most preferably 45 minutes to 120 minutes. Generally, lower temperatures require a longer period of time.

With regard to the mixing ratio of the electrically conductive particulate to the binder, a less binder content increases electrochemical capacity derived from an electrode formed from a composition containing the particulates and the binder, but decreases the mechanical strength of such an electrode. Therefore, the weight ratio of the particulate to the binder in the composition is usually within the range of 90:10–20:90, preferably 75:25–30:70, more preferably 60:40–40:60, and most preferably 55:45–45:55.

In order to improve electrical conductivity between the particulates, a composition containing the particulates and the binder may be mixed with carbon black such as "Niteron #200IS" manufactured by Shin Nihon Steel Chemical Co., Ltd. and "Denka Black" manufactured by Denka Co., Ltd., and "XC72R" manufactured by Cablack Co., Ltd, graphite such as "USSP" sold by Nihon Kokuen Shoji and "5500F" manufactured by Tokai Carbon, acetylene black such as "3950" manufactured by ex-Mitsubishi Kasei Co., Ltd., ketjen black such as "EC600JD" and "ECP04" manufactured by Mitsubishi Chemical co., Ltd., and metallic particulates. Electrically conductive conjugate organic materials such as doped polyvinylenephenylene, polythiophene and polpyrrole may also be mixed with the composition.

These electrical conductivity improvers may be blended in an equivalent amount of the electrically conductive particulates or less, preferably in an amount of 30% or less, more preferably of 10% or less, and most preferably 2% or less, based on the weight of the electrically conductive particulates.

An additional electrode formed from a composition containing the above-described electrically conductive particulates and binder may be arranged on any site of an electrically conductive substrate. In the case of arranging this additional electrode on a transparent electrically conductive substrate, it should be carefully arranged such that the transparency or transmissivity of the substrate is not harmed. In general, the additional electrode is preferable in the form of continuous or discrete stripes which may be vertical or horizontal ones, or wave-like ones, or in the form of meshes. Especially, in the case where visions and views are needed to be vividly transmitted or reflected images are needed to be vividly reflected, the additional electrode in the form of stripes or meshes is desirously provided at equal intervals which are selected within the range of 0.3 mm to 10 cm, preferably 0.5 mm to 8cm, and more preferably 1.0 mm to 5 cm. The width of the additional electrode is on the order from 50 to 5,000 $\mu$m, more preferably 100 to 2,000 $\mu$m, the thickness thereof is usually 50 $\mu$m or more, preferably 100 $\mu$m or more, and more preferably 130 $\mu$m or more.

The coating ratio of the additional electrode coated over the electrically conductive surface of an substrate, indicated by [(total additional electrode area/the electrically conductive surface area of a substrate)×100] is arbitrary selected but is usually within the range of 3 to 70%, preferably 5 to 50%.

Although no particular limitation of the mechanical strength of the additional electrode, it has preferably a relatively high strength. For instance, a striped electrode has a mechanical strength of 10 gf or greater, preferably 50 gf or greater, more preferably 100 gf or greater, and most preferably 200 gf or greater. The upper limit of the mechanical strength is generally on the order of 10,000 gf.

Moreover, in the case of assembling an electrochromic device using a transparent electrically conductive substrate having the additional electrode disposed thereon, the portions of the rear surface, i.e., which is opposite to the surface having the additional electrode is arranged, corresponding to the pattern thereof may be coated with white or silver electrically conductive paste for the purpose of improving the visual comfortableness and aesthetic appearance upon decoloration and such a substrate may be produced by a method in which a pattern which is the same or substantially same as that of the additional electrode to be arranged, using a white pigment, on one surface of a transparent substrate and an transparent electrically conductive film is laminated entirely on the other surface of the substrate, followed by forming the additional electrode thereon. The white pigment may be titanium oxide, zinc oxide, lithopone, white lead, antimony white, and zircone oxide.

Regardless of whether a substrate is transparent or opaque, the following methods are suitable for arranging the additional electrode on an electrically conductive substrate.

(1) Electrically conductive particulates and a binder are mixed in the presence or absence of an organic solvent such as butyl cellosolve, if necessary, together with an electrical conductivity improver, so as to be pasted. The pasted mixture is coated in a desired pattern on the electrically conductive surface of a substrate by using a conventional printing method such as screen printing, litho printing, gravure printing, plate printing, relief printing, and specialty printing and cured after a certain period of time.

(2) An electrically conductive substrate is provided on its surface with grooves in the form of a desired pattern before hand. The grooves are filled with the above-described paste and an excess of pates is removed with a spatula. The paste in the grooves are cured after a certain period of time.

(3) The paste is traced while being discharged from a dispenser machine so as to be formed into a desired pattern and then cured after a certain period of time.

In the case of forming patterns using a dispenser machine, the distance between the tip of the nozzle thereof and a substrate is selected suitably, depending upon the height and width of stripes to be formed, but is usually within the range of 0.01 mm to 10 mm. The discharge rate of the paste from the dispenser nozzle is usually within the range of 1 mg/s to 50 mg/s. The dispenser traces the paste at a speed of 10 mm/s to 500 mm/s. A plurality of dispenser nozzles may be used for forming patterns and reducing the time for forming such patterns.

An electrochromic layer of an electrochromic device will be described. This layer is generally formed with an electrochromic material. This layer may contain the first or second ion conductive material of the present invention. Alternatively, it is also possible to use a layer obtained by adding an electrochromic material to an ion conductive material so as to have both functions as an electrochromic layer and an ion conductive layer. Suitable electrochromic materials are reduction chromogenic materials such as $WO_3$, $MoO_3$, $V_2O_5$, $Nb_2O_5$, and $TiO_2$, and organic electrochromic materials such as polyaniline, polytionphene, polypyrrole, polyviologen, and viologen.

An electrochromic layer is obtained by forming the material into a film by a conventional known method such as vacuum-depositing, electron beam vacuum-depositing, and sputtering.

At least one of two electrically conductive substrates used for an electrochromic device according to the present invention is preferably transparent. The other substrate may be transparent or opaque, or may be a reflective electrically conductive substrate.

In general, an electrochromic device having two conductive substrates both of which are transparent are suitable for use in a display device and a light controllable glass. A combination of a transparent conductive substrate and an opaque conductive substrate is suitable for use in a display device, while a combination of a transparent conductive substrate and a reflective substrate is suitable for use in an electrochromic mirror.

The reflective electrically conductive substrate may be exemplified by (1) a laminate comprising a non-conductive transparent or opaque substrate and a reflective electrode layer formed thereon, (2) a laminate comprising a non-conductive transparent substrate having a transparent electrode layer on one of its surfaces and a reflective electrode layer on the other surface, (3) a laminate comprising a non-conductive transparent substrate having a reflective layer formed thereon and further a transparent electrode layer formed thereon, (4) a laminate comprising a reflective substrate and a transparent electrode layer formed thereon, and (5) a plate-like substrate which itself functions as a reflective layer and an electrode.

The term "reflective electrode layer" used herein denotes a thin film which has a specular surface and is stable electrochemically. Such a thin film are the films of metal such as gold, platinum, tungsten, tantalum, rhenium, osmium, iridium, silver, nickel and palladium and the film of an alloy such as platinum-palladium, platinum-rhodium and stainless steel. Any suitable method may be used for the formation of the thin film having a specular surface, and thus vacuum deposition, ion-plating or sputtering is suitably selected.

A substrate, onto which a reflective electrically conducitve layer is formed, may be transparent or opaque. Therefore, the substrate may be the above-exemplified transparent substrates, various opaque plastics, glasses, woods, and stones.

The above-mentioned reflective plate and reflective layer are substrates and thin films both of which have a specular surface. The plate and layer may be a plate or a thin film, formed from silver, chrome, aluminum, stainless steel, and nickel-chrome.

In the case where the above-described reflective electrode layer itself has rigidity, a substrate therefor may be omitted.

An ion conductive layer for an electrochromic device of the present invention is formed by the first or second ion conductive material of the present invention. No particular limitation is imposed on a method for forming the ion conductive layer. For examples, a mixture which is a precursor of the ion conductive material is injected into a cell formed by a pair of substrates either of which is provided with an electrochromic layer, placed, facing each other such that the electrochromic layer becomes the inner surface and sealed at the edges of the opposed surfaces, by vacuum injection, atmospheric injection or a meniscus method and if the precursor contains the polymerizable monomer, it is polymerized thereby forming a solid ion conductive layer. Alternatively, after forming an ion conductive layer onto one of the electrically conductive substrates, the other substrates is superimposed thereon. When the latter method is employed, the electrochromic layer and the ion conductive layer must be in an adjacent relation to each other.

No particular limitation is imposed on the thickness of the ion conductive layer. However, the ion conductive layer has a thickness of usually 1 µm or more, preferably 10 µm or more and 3 mm or less, preferably 1 mm or less.

The inventive ion conductive materials have both enhanced ion conductivity and excellent ultraviolet absorbing capability. Therefore, the ion conductive materials are suitable not only for uses which require a high ion conductivity, such as in cells, batteries and capacitors, but also for uses in an ion conductive layer of an electrochromic device.

The inventive electrochromic device can be suitably used in display devices, light-controllable glasses such as smart window, antiglare mirrors for automobiles, and electrochromic mirrors such as decorative mirrors for indoor and outdoor uses. The inventive electrochromic devices are also applicable to various illuminations purposes such as lights for indoor and outdoor and headlights for vehicles and airplanes. In these uses, the inventive electrochromic devices arranged in the passage of light emitted from a light source can effectively control the volume and color of the light during the illumination and can exhibit a superior effect as an ultraviolet absorbing filter which can simultaneously cut ultraviolet radiation in the illumination light.

Examples of the invention will now be provided, with the understanding that the invention is in no way limited by these examples.

EXAMPLE 1

An ion conductive material was obtained by adding 2,2',4,4'-tetrahydroxybenzophenone to a mixture of 4.0 g of γ-butylolactone and 0.4 g of lithium perchlorate to be a homogeneous solution. This solution was injected into the inner space with 0.2 mm width of a transmissive cell. The transmittance spectrum of this cell was measured using a tungsten lump and a deuterium lump and found that it was 0.1% or less in a transmissivity of a light of a wavelength within the range of 300 nm to 380 nm. The ion conductivity of the resulting solution was measured in an electrolytic cell and found to be $1.5 \times 10^{-3}$ S/cm at 25° C.

After a xenon light of an illuminance of 60 W/m$^2$ was irradiated to the solution for 200 hours, the ion conductivity thereof did not change and no particular change was not observed.

Comparative Example 1

A solution was prepared by following the procedure of Example 1 except that the amount of 2,2',4,4'-tetrahydroxybenzophenone was decreased. Like Example 1, the transmittance spectrum was measured and found to be on the order of 0.1% in a transmissivity of a light having a wavelength of 360 nm. Likewise, the ion conductivity of the resulting solution was measured and found to be $1.0 \times 10^{-3}$ S/cm at 25° C.

A xenon light of an illuminance of 60 W/m$^2$ was irradiated to the solution for 200 hours, but it was found that butyric odor was developed and the γ-butylolactone was deteriorated.

EXAMPLE 2

A homogenous solution was obtained by adding 0.2 g of LIBF$_4$ and 3-(5-chloro-2H-benzotriazole-2-yl)-5-t-butyl-4-hydroxyphenylpropanoic acid octyl ester to a mixed solution of 1.0 g of methoxypolyethylene glycol monomethacrylate (oxyethylene unit number: 4) manufactured by SHIN-NAKAMURA CHEMICAL CO., LTD. under the trade name of "M40G", 0.1 g of polyethylene glycol dimethacrylate (oxyethylene unit number: 9) manufactured by SHIN-NAKAMURA CHEMICAL CO., LTD. under the trade name of "9G" and 2.0 g of propylene carbonate. To the homogenous solution was added 0.02 g of 2,4,6-trimetylbenzoyl-diphenylphosphineoxide manufactured by BASF Co,. Ltd., under the name of "LUCIRIN TPO" as a photopolymerization initiator in a dark room thereby obtaining a homogeneous solution. The resulting solution was deaerated and was cast over a Teflon plate to be 0.2 mm in thickness, followed by irradiation of light from a fluorescent lump of 15 W, equipped with a UV cut filter which cuts a wavelength of 390 nm or less, under an atmosphere of nitrogen at room temperature for 20 minutes.

The ion conductivity of the resulting ion conductive material thus cured was measured in accordance with a complex impedance method and was found to be $5.5 \times 10^{-3}$ s/cm at 25° C.

Furthermore, the transmittance spectrum of the ion conductive material was measured and found to be 0.01% or less in a transmissivity of a light having a wavelength within the range of 300 to 370 nm.

After a xenon light of an illuminance of 60 W/m$^2$ was irradiated to the solution for 200 hours, the ion conductivity thereof did not change and no particular change was not observed.

Comparative Example 2

An ion conductive material was prepared by following the procedure of Example 2 except that the amount of 3-(5-chloro-2H-benzotriazole-2-yl)-5-t-butyl-4-hydroxyphenylpropanoic acid octyl ester was decreased. Like Example 2, the transmittance spectrum was measured and found to be on the order of 2% in a transmissivity of a light having a wavelength of 360 nm. Likewise, the ion conductivity of the resulting solution was measured and found to be $1.0 \times 10^{-3}$ S/cm at 25° C.

After a xenon light of an illuminance of 60 W/m$^2$ was irradiated to the solution for 200 hours, it was found that the ester bond of the polymer was broken.

EXAMPLE 3

An empty cell with an inlet was prepared by applying an epoxy resin in the form of lines onto the peripheral edges, except a portion to be used as an inlet, of either one of an ITO-coated transparent glass substrate having stripes of active carbon paste printed on the ITO coated surface or an ITO-coated transparent glass having an tungsten oxide layer formed on the ITO-coated surface, and then placing the other substrate onto the epoxy resin applied substrate such that the ITO surfaces face each other with a space of 0.2 mm, followed by pressing the substrates so as to cure the epoxy resin.

On the other hand, a homogeneous solution was obtained by adding 0.4 g of lithium perchlorate to a mixed solution of 0.5 g of methoxypolyethylene glycol monomethacrylate (oxyethylene unit number: 4) manufactured by SHIN-NAKAMURA CHEMICAL CO., LTD. under the trade name of "M40G", 0.02 g of polyethylene glycol dimethacrylate (oxyethylene unit number: 9) manufactured by SHIN-NAKAMURA CHEMICAL CO., LTD. under the trade name of "9G", 4.0 g of acetnitrile, 0.1 g of 2-hydroxy-2-methyl-phenyl-propane-1-on and 3-(5-methyl-2H-benzotriazole-2-yl)-5-(1-methyl)-4-hydroxybenzene propanoic acid.

The resulting solution was deaerated and injected into the cell obtained above thorough the inlet. The inlet was then sealed with an epoxy resin. The solution in the cell was cured by exposing a light of a black lump to the both surfaces of the cell thereby obtaining an electrochromic device (light-controllable glass).

The light-controllable glass when assembled was not colored and had a transmissivity of about 60%. The light-controllable glass was quick in response to an application of an electric voltage and exhibited excellent electrochromic properties. The light-controllable glass was colored upon an application of a voltage of 1.5 V and had a transmissivity of about 20%.

The ion conductivity of the resulting light-controllable glass was measure and found to be $6.8 \times 10^{-3}$ S/cm.

The transmittance spectrum of an ion conductive material layer prepared by the same procedure as in Example 1 was measured using a tungsten lump and a deuterium lump and found that it was 0.01% or less in a transmissivity of a light of a wavelength within the range of 300 nm to 390 nm.

A xenon light of an illuminance of 60 W/m² was irradiated to the solution for 200 hours, but the ion conductivity thereof did not change and no particular change was not observed.

Comparative Example 3

A light-controllable glass was prepared by following the procedure of Example 3 except that the amount of 3-(5-methyl-2H-benzotriazole-2-yl)-5-(1-methyl)-4-hydroxybenzene propanoic acid was decreased. Like Example 3, the transmittance spectrum was measured and found to be on the order of 1% in a transmissivity of a light having a wavelength of 360 nm. Likewise, the ion conductivity of the resulting ion conductive material was measured and found to be $5.8 \times 10^{-3}$ S/cm at 25° C.

A xenon light of an illuminance of 60 W/m was irradiated to the solution for 200 hours, and photochromism occurs in the light-controllable glass and the decoloration response was 4 times worse than before the irradiation.

EXAMPLE 4

An empty cell with an inlet was prepared by applying an epoxy resin in the form of lines onto the peripheral edges, except a portion to be used as an inlet, of either one of an ITO-coated transparent glass substrate having a tungsten oxide layer formed on the ITO coated surface or an ITO-coated transparent glass with no tungsten oxide layer, and then placing the other substrate onto the epoxy resin applied substrate such that the ITO surfaces face each other with a space of 0.2 mm, followed by pressing the substrates so as to cure the epoxy resin.

A homogeneous solution was obtained by adding 0.4 g of $LiClO_4$ to a mixed solution of 0.5 g of methoxypolyethylene glycol monomethacrylate (oxyethylene unit number: 4) manufactured by SHIN-NAKAMURA CHEMICAL CO., LTD. under the trade name of "M40G", 0.02 g of polyethylene glycol dimethacrylate (oxyethylene unit number: 9) manufactured by SHIN-NAKAMURA CHEMICAL CO., LTD. under the trade name of "9G", 4.0 g of γ-butyrolactone, 0.05 g of 2,4,6-trimetylbenzoyl-diphenylphosphineoxide manufactured by BASF Co,. Ltd., under the name of "LUCIRIN TPO", and 3-(5-chloro-2H-benzotriazole-2-yl)-5-t-butyl-4-hydroxyphenylpropanoic acid octyl ester.

The resulting solution was deaerated and injected into the cell obtained above thorough the inlet. The inlet was then sealed with an epoxy resin. The solution in the cell was cured by irradiating light from a fluorescent lump of 15 W, equipped with a UV cut filter which cuts a wavelength of 390 nm or less, under an atmosphere of nitrogen at room temperature thereby obtaining an electrochromic device (light-controllable glass).

The light-controllable glass when assembled was not colored and had a transmissivity of about 60%. The light-controllable glass was quick in response to an application of an electric voltage and exhibited excellent electrochromic properties. The light-controllable glass was colored upon an application of a voltage of 1.5 V and had a transmissivity of about 16%.

The ion conductivity of the resulting light-controllable glass was measure and found to be $6.3 \times 10^{-3}$ S/cm at 25° C.

The transmittance spectrum of an ion conductive material layer prepared by the same procedure as in Example 1 was measured using a tungsten lump and a deuterium lump and found that it was 0.01% or less in a transmissivity of a light of a wavelength within the range of 300 nm to 360 nm and 0.01% or less in a transmissivity of a light of a wavelength within the range of 300 nm to 390 nm.

A xenon light of an illuminance of 60 W/m² was irradiated to the solution for 200 hours, but no particular change was observed.

Comparative Example 4

A light-controllable glass was prepared by following the procedure of Example 4 except that the amount of 3-(5-chloro-2H-benzotriazole-2-yl)-5-t-butyl-4-hydroxyphenylpropanoic acid octyl ester was reduced. Like Example 4, the transmittance spectrum was measured and found to be on the order of 1% in a transmissivity of a light having a wavelength of 360 nm. Likewise, the ion conductivity of the resulting ion conductive material was measured and found to be $4.8 \times 10^-$S/cm at 25° C.

A xenon light of an illuminance of 60 W/m² was irradiated to the solution for 200 hours, and photochromism occurs in the light-controllable glass and the decoloration response was 3 times worse than before the irradiation.

What is claimed is:

1. An electrochromic device comprising:
   (a) a pair of electrically conductive substrates facing each other and having on their inner surfaces electrode layers; and (b) an ion conductive layer disposed between the substrates, wherein the ion conductive layer is formed from a solid ion conductive material having an ion conductivity of $1\times10^{-7}$ or greater at 25° C., obtained by solidifying a mixture comprising (i) a solvent, (ii) a supporting electrolyte, (iii) a polymerizable monomer selected from the group consisting of a polyurethane monomer and an acryloyl- or methacrylate-modified polyalkyleneoxide, and (iv) an ultraviolet absorber, by polymerizing the polymerizable monomer, wherein the ultraviolet absorber is present in amount such that a transmissivity of electromagnetic rays having a wavelength of 300 to 360 nm and transmitting through a 0.2 mm thick layer of the ion conductive material is maintained at 0.1% or less.

2. The electrochromic device according to claim 1, wherein the device further has an ultraviolet radiation cut capability.

3. The electrochromic device according to claim 1, wherein the ultraviolet absorber is present in amount such that a transmissivity of electromagnetic rays having a wavelength of 300 to 390 nm and transmitting through a 0.2 mm thick layer of the ion conductive material is maintained at 0.1% or less.

4. The electrochromic device according to claim 1, wherein the polyurethane monomer is a monomer represented by formula (6):

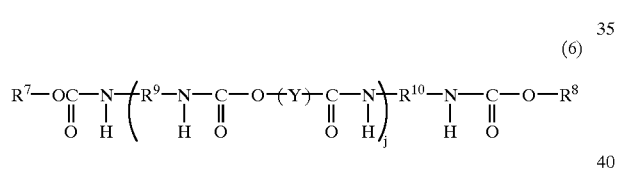

(6)

wherein $R^7$ and $R^8$ are the same or different and are each a group represented by formula (7), (8) or (9):

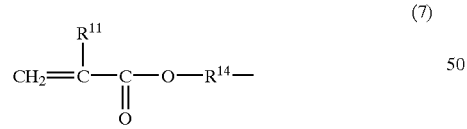

(7)

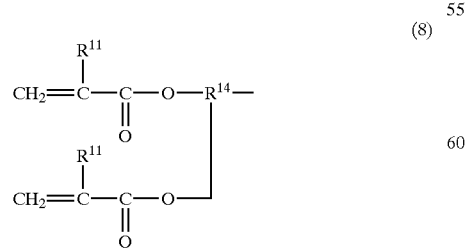

(8)

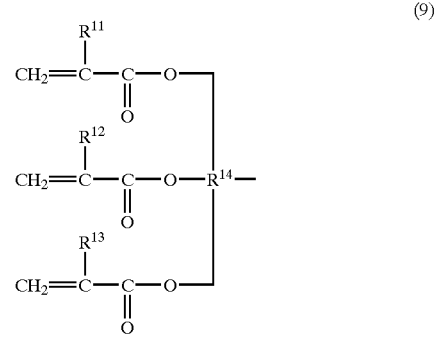

(9)

wherein $R^{11}$, $R^{12}$ and $R^{13}$ are the same or different and are each hydrogen or an alkyl group having 1 to 3 carbon atoms, and $R^{14}$ is an organic residue having 1 to 20 divalent through quatervalent carbon atoms; and wherein $R^9$ and $R^{10}$ are the same or different and are each a divalent hydrocarbon residue having 1 to 20 carbon atoms; Y is selected from the group consisting of a polyether unit, polyester unit, a polycarbonate unit and a mixed unit thereof; and j is an integer from 1 to 100.

5. The electrochromic device according to claim 1, wherein the acryloyl- or methacrylate-modified polyalkyleneoxide is selected from the group consisting of monomers represented by formulas (14), (15) and (16):

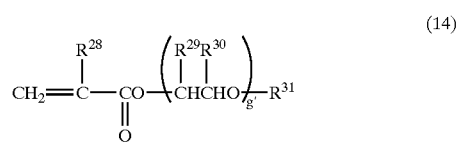

(14)

wherein $R^{28}$, $R^{29}$, $R^{30}$ and $R^{31}$ are each independently hydrogen or an alkyl group having 1 to 5 carbon atoms, and g' is an integer of 1 or more;

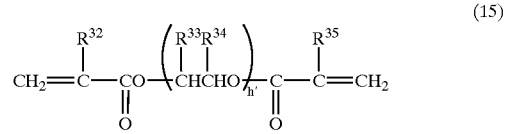

(15)

wherein $R^{32}$, $R^{33}$, $R^{34}$ and $R^{35}$ are each independently hydrogen or an alkyl group having 1 to 5 carbon atoms, h' is an integer of 1 or greater; and

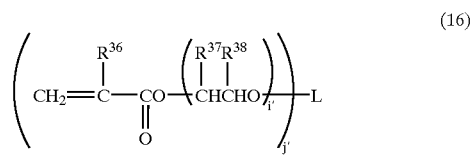

(16)

wherein $R^{36}$, $R^{37}$ and $R^{38}$ are each independently hydrogen or an alkyl group having 1 to 5 carbon atoms, i' is an integer of 1 or greater, j' is an integer from 2 to 4, and L is a connecting group of valence indicated by "j'".

6. The electrochromic device according to claim 5, wherein the acryloyl- or methacrylate-modified polyalkyleneoxide comprises a monofunctional modified polyalkyleneoxide represented by formula (14) and 0.1 to 20 parts by weight of at least one selected from the group consisting of a difunctional modified polyalkyleneoxide of formula (15) and a polyfunctional modified polyalkyleneoxide of formula (16), based on 100 parts by weight of the monofunctional modified polyalkyleneoxide.

7. The electrochromic device according to claim 1, wherein the polymerizable monomer is present in an amount of 5 to 50 percent by weight of the mixture.

* * * * *